United States Patent

Buhrgard

[11] Patent Number: 5,579,324
[45] Date of Patent: Nov. 26, 1996

[54] SYNCHRONIZING CIRCUIT ARRANGEMENT

[75] Inventor: Karl S. M. Buhrgard, Stockholm, Sweden

[73] Assignee: Telefonaktiebolaget LM Ericsson, Stockholm, Sweden

[21] Appl. No.: 320,661

[22] Filed: Oct. 11, 1994

[30] Foreign Application Priority Data

Oct. 12, 1993 [SE] Sweden ................. 93033413

[51] Int. Cl.⁶ ..................................... H04J 3/06
[52] U.S. Cl. .................... 370/105.1; 370/112; 371/42
[58] Field of Search ............... 370/100.1, 105.1, 370/105.3, 105.4, 106, 108, 94.1, 112, 13; 375/365, 356, 368, 372; 371/37.1, 37.7, 47.1, 42

[56] References Cited

U.S. PATENT DOCUMENTS

| | | | |
|---|---|---|---|
| 4,788,681 | 11/1988 | Thomas et al. | 370/105.1 |
| 4,796,282 | 1/1989 | Yoshida | 375/368 |
| 4,873,663 | 10/1989 | Baranyai et al. | 370/100.1 |
| 4,894,826 | 1/1990 | Aggers et al. | 370/13 |
| 4,922,438 | 5/1990 | Ballweg | 370/105.3 |
| 5,014,272 | 5/1991 | Yoshida | 370/105.1 |
| 5,107,495 | 4/1992 | Kamoi et al. | 370/100.1 |
| 5,130,984 | 7/1992 | Cisneros | 370/94.1 |
| 5,131,012 | 7/1992 | Dravida | 371/42 |
| 5,345,451 | 9/1994 | Uriu et al. | 371/42 |
| 5,367,544 | 11/1994 | Bruekheimer | 371/42 |

FOREIGN PATENT DOCUMENTS

WO93/19986 10/1993 WIPO.

Primary Examiner—Douglas W. Olms
Assistant Examiner—Chau T. Nguyen
Attorney, Agent, or Firm—Burns, Doane, Swecker & Mathis, L.L.P.

[57] ABSTRACT

A synchronizing circuit arrangement included in a multiplexing/demultiplexing unit receives a bit stream coordinated to a data packet. The bit positions and values within a predetermined part of a consecutive bit sequence of each transmitted data packet are constantly selected so that a predetermined check calculation will give a predetermined value (for instance, "0"). A consecutive bit sequence corresponding to the predetermined part of a consecutive bit sequence and belonging to respective received data packets is evaluated in order to establish the extent to which the check calculation gives the predetermined value. When agreement is found, it is assumed that the boundary between two closely adjacent data packets is established via the bit sequence of the predetermined part of a consecutive bit sequence. Each incoming bit stream is synchronized through the medium of a control block or control logic by inserting a time delay corresponding to synchronism into a series-parallel converter for respective bit streams. The synchronized, parallel-format bit streams can be delivered via the control block or control logic to a memory which delivers the bit stream to the outgoing connection via buffer circuits and a parallel-series converter.

19 Claims, 2 Drawing Sheets

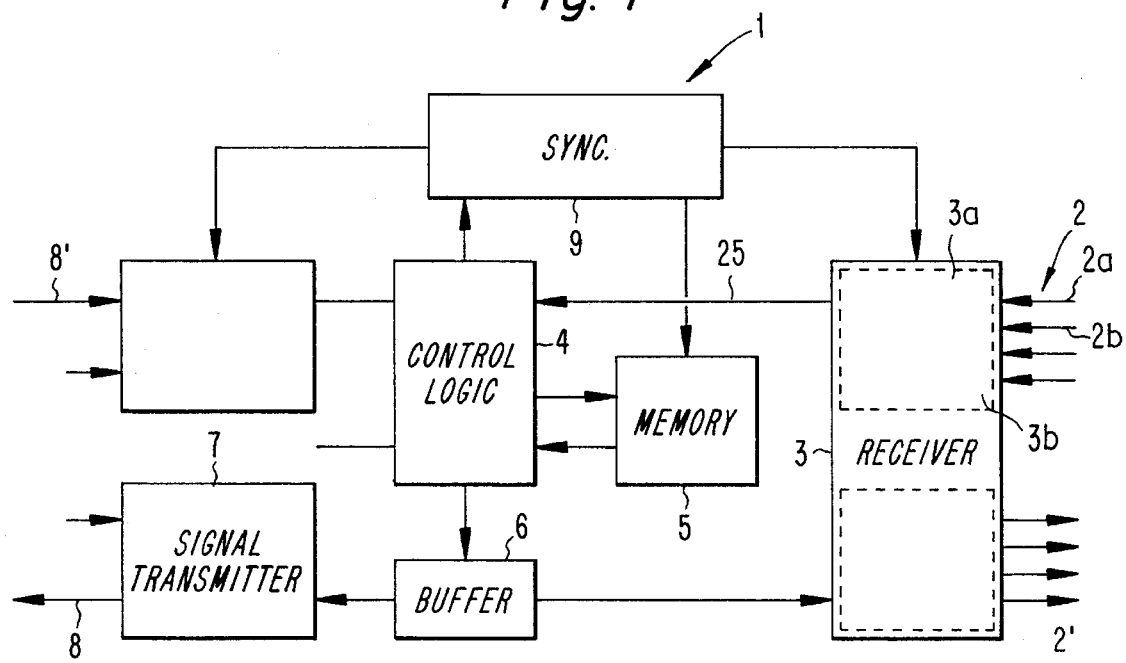
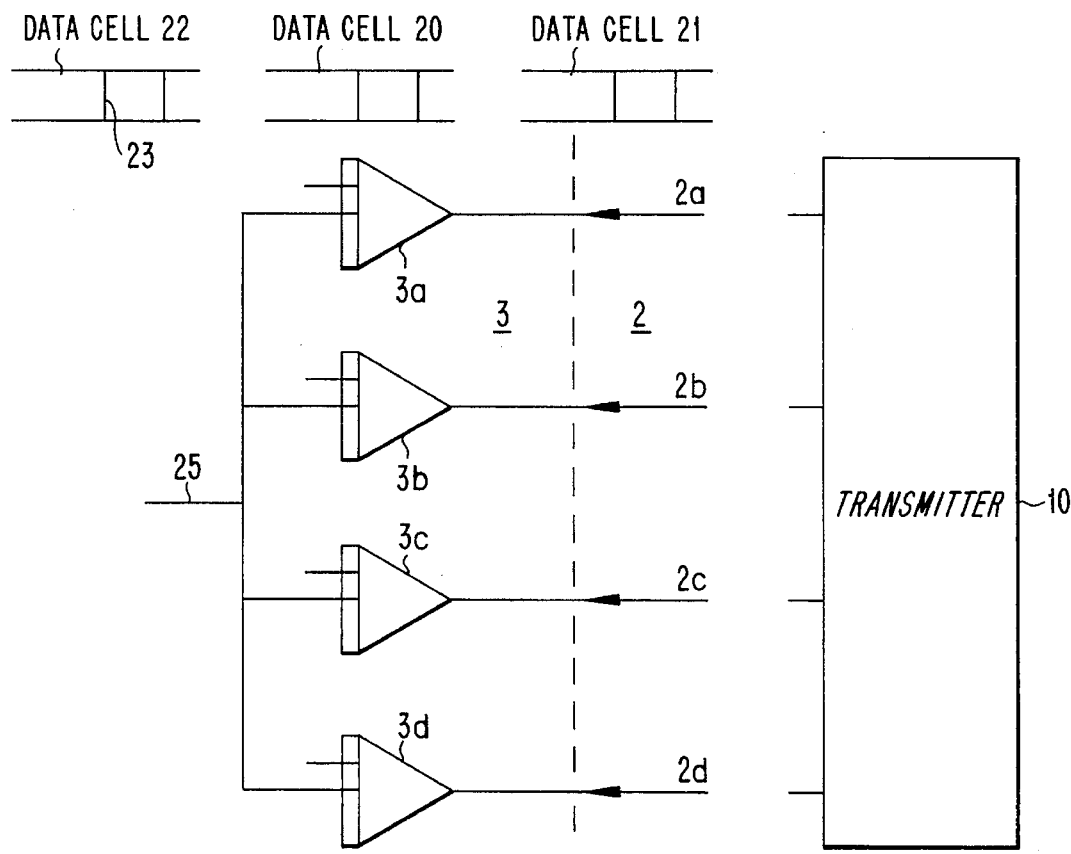

SYNCHRONIZING CIRCUIT ARRANGEMENT

TECHNICAL FIELD

The present invention relates to a synchronizing circuit arrangement and then more particularly, but not exclusively, to a synchronizing circuit arrangement adapted for use in a multiplexing/demultiplexing unit.

Such units are used to increase or decrease the transmission rate of pulsated signal streams, so-called bit streams, occurring on connections.

The invention finds particular use when the pulsated signals within the bit stream are coordinated to form data packets or data cells having an address indicating section and an information-carrying section, preferably structured in the manner described in the ATM system.

The inventive synchronizing circuit arrangement is based on the ability to establish in one or more sequentially occurring and orientated bit streams grouped in closely following and clearly determined data packets a relevant boundary between two, mutually adjacent and closely sequential data packets with the aid of a receiving circuit, and therewith create provisions for synchronizing received data packets with a synchronizing signal in said receiver.

The invention is also based on the possibility of establishing an "interface" or a "boundary" between two mutually sequential data packets, where the last bit position of a preceding data packet is immediately followed by the first bit position of an immediately following data packet.

DESCRIPTION OF THE BACKGROUND ART

Synchronizing circuit arrangements of the aforedefined kind are known to the art and are also standardized. For instance, it is known to provide in a multiplexing/demultiplexing unit a synchronizing circuit arrangement for synchronizing bit streams that are coordinated to form a data packet and to use the principle of dividing each data packet into an address-carrying section and an information-carrying section, and to divide the whole of the data packet into a given number of parts, one or more bytes or words. When practicing known techniques, a boundary can be established between two closely following data packets in a sequentially oriented bit stream divided into mutually sequential and clearly defined data packets, by constantly giving the bit positions a positional value within a predetermined defined part of a consecutive bit sequence of each transmitted data packet so that they will have a given value (for instance "0") predetermined by a predetermined check or control calculation.

A bit sequence belonging to a respective received data packet and corresponding to the aforesaid determined part of a consecutive bit sequence is evaluated in order to establish the extent to which said check calculation will give the predetermined value.

When agreement is found, the boundary between two mutually sequential data packets is established via the bit sequence of the selected part.

In the case of a multiplexing function, the bit stream coordinated within the data packet will occur on a number of incoming connections at a bit rate higher than 100 Mb/s and then at a higher rate on an outgoing connection, whereas the reverse applies in the case of a demultiplexing function, without changing the information content of the data packet.

With regard to the embodiment that describes the present invention, it can be mentioned that it is known to supplement a standardized ATM data cell or ATM data packet with an additional information-carrying bit position section which is intended to provide switch-internal address information and which is added to the standardized ATM data cell at the input to the switch unit and is removed at the output thereof.

An example of the earlier standpoint of technique in this regard is illustrated and described in U.S. Pat. No. 5,130,984.

SUMMARY OF THE INVENTION

TECHNICAL PROBLEMS

When considering the known prior art as described above, it will be seen that a technical problem resides in providing a synchronizing circuit arrangement which will enable a receiving unit to determine or establish a boundary between mutually adjacent and closely following data packets and which will enable each incoming bit stream to be synchronized with the aid of simple functional means, such as an integrated circuit, through the medium of a control block or control logic, by applying to a series-parallel converter for respective bit streams a time delay which corresponds to the synchronism required, wherein the resultant parallel-formatized synchronized bit streams can be supplied through said control block or control logic to a memory which delivers the bit stream on the outgoing connection through the medium of buffer circuits and a parallel-series converter.

It will also be seen that another technical problem is one of realizing the advantages that are associated with choosing the address-carrying standardized section in an ATM data cell or the like, or a combination of this section and an added section as a reference section or part, so as to provide switch-internal address information.

A further technical problem is one of realizing the advantages that are associated with selecting from each data-packet bit sequence a predetermined part and then dividing this part into a predetermined number of sub-sections.

It will also be seen that a technical problem is one of realizing the necessity of utilizing the fact that the value of the bit positions within said sections in transmission must constantly be so selected that they will always provide a predetermined value that is recognizable by the receiver in a predetermined check calculation or chosen parity check.

It will also be seen that a technical problem is one of realizing the significance in evaluating in the receiving unit a consecutive bit sequence belonging to respective data packets and equal to or exceeding said part simultaneously, so as to establish the extent to which each of the subsections accommodated therein gives the predetermined value in the check calculation.

Another technical problem is one of realizing the significance that when agreement occurs between a calculated result from a check calculation or parity check inserted in the receiving unit for the sub-sections of respective data packets and a given value, that the bit sequence concerned within respective subsections is able to initiate synchronism, therewith enabling the boundary between two mutually adjacent and closely following data packets to be established.

It will also be seen that a technical problem resides in realizing those advantages that are afforded when the whole of the determined part is comprised exactly of an addressable part of respective data packets.

Another technical problem is one of providing with the aid of simple means conditions which will enable the section to be divided into individual sub-sections in accordance with the number of bit positions, and that the number of sub-sections is chosen for an ATM data cell with or without an additional switch-internal addressing information to at least four.

It will also be seen that a technical problem resides in realizing the degree of reliability that is achieved and therewith the advantages that are afforded when the boundary is not established until agreement is found between calculated and anticipated results from the check calculation or parity check for respective sub-sections relating to a predetermined number of mutually sequential data packets.

Another technical problem is one of realizing that when there is no agreement, it is necessary to carry out a search which involves moving a given part of a consecutive bit sequence through one bit position forwards or backwards and then making a check calculation on the new part with the sub-section in the same manner throughout the entire data packet and not to establish the boundary until agreement is found between the obtained result and the anticipated result from the check calculation or the parity check for respective sub-sections, and to again move the determined part through one bit position in the same direction when agreement is still not found.

SOLUTION

The present invention solves one or more of the aforesaid technical problems with the aid of a synchronizing circuit arrangement of the kind defined in the introduction and in the preamble of the following Claim 1.

Accordingly, in accordance with the present invention, each incoming bit stream is synchronized with the aid of an integrated circuit and a control block or control logic formed thereby by inserting in a series-parallel converter for respective bit streams a time delay which corresponds to synchronism, wherein synchronized bit streams occurring in a parallel format are delivered to a memory via the control or control logic, and wherein the bit streams are delivered on said outgoing connection at a changed bit rate, via buffer circuits and a parallel-series conversion. According to proposed embodiments lying within the scope of the inventive concept, the aforesaid given part of a consecutive bit sequence is comprised of an addressable part of respective data packets.

It is also suggested that said part is divided into a predetermined number of sub-sections, for instance four sub-sections.

According to one preferred embodiment of the invention, the boundary is not established until agreement has repeatedly been established for a predetermined number of mutually sequential data packets.

It is also proposed that when agreement is not found, the given part of a consecutive bit sequence is moved within said consecutive bit sequence by one bit position, either forwards or backwards, and that a new check calculation is made on the new part within the control unit in the same way, so that the new boundary can be established when agreement is found, whereas if agreement is not found the given part is again moved one bit position in the same direction.

ADVANTAGES

Those advantages primarily characteristic of an inventive synchronizing circuit arrangement reside in the possibility of establishing the boundary between two incoming and immediately following data packets among a continuous stream of data packets, and in the ability of creating conditions for each incoming bit stream on each connection that will enable a time delay corresponding to synchronism to be inserted so that all bit streams that are able to occur as a grouped logic link incoming to a control block or control logic will obtain synchronous and coordinated storage in a memory and be delivered therefrom serially and in sequence to an outgoing connection.

The main characteristic features of the inventive synchronizing circuit arrangement are set forth in the characterizing clause of the following claim 1.

BRIEF DESCRIPTION OF THE DRAWINGS

The invention will now be described in more detail with reference to an exemplifying embodiment of an arrangement which functions in accordance with the principles of the invention, and also with reference to the accompanying drawings, in which FIG. 1 illustrates an integrated circuit for a multiplexing/demultiplexing unit having four incoming connections and one outgoing connection, or vice versa;

FIG. 2 illustrates schematically a transmitter and a series-parallel converter coordinated in a receiver to four incoming connections;

DESCRIPTION OF EMBODIMENTS AT PRESENT PREFERRED

Figures 3, 4:
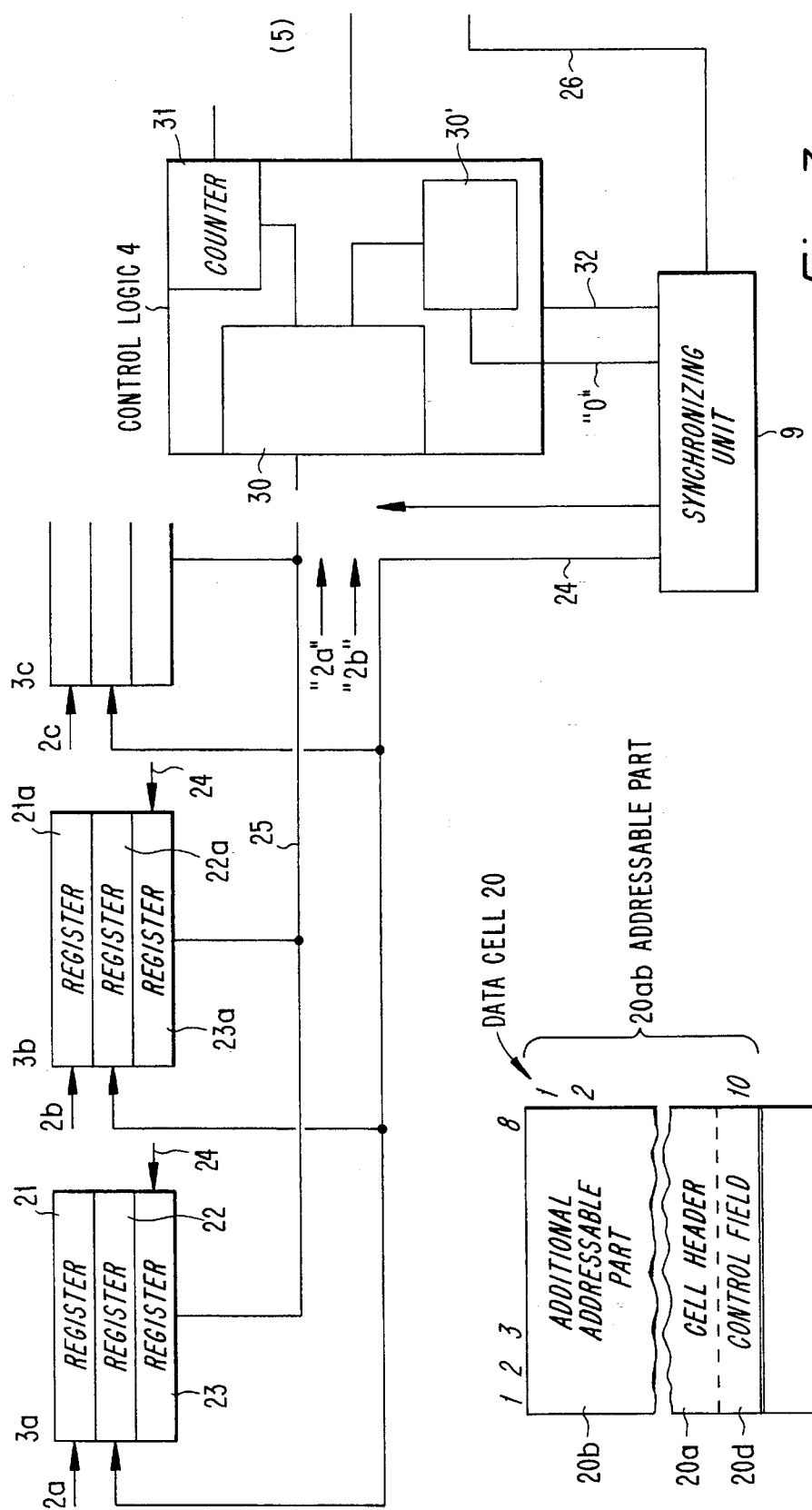
FIG. 3 is a principle diagram illustrating a function block arrangement for series-parallel conversion, and also shows coaction with a control block or control logic.
FIG. 4 illustrates the orientation of the bit positions in a standardized ATM data cell with an additional section for switch-internal addressing.

FIG. 1 is a block schematic which illustrates a multiplexing/demultiplexing unit 1 in the form of an integrated circuit.

The unit 1 has four incoming connections 2 which are connected to a signal-receiving circuit 3 which itself is connected (25) to a control block or control logic 4 coacting with a memory and a buffer circuit 6 which through the medium of a signal-transmitting circuit 7 functions to transmit a bit stream in series form on a connection 8 adapted to a rate which exceeds the rate at which respective bit streams occur on each of the four incoming connections 2.

Also shown in FIG. 1 is a synchronizing arrangement 9 which will be described below in more detail, together with the control logic 4.

The unit 1 is also adapted to perform a demultiplexing function and is intended to receive on connection 8' a bit stream series and to break up the bit streams into four parallel bit streams over a respective outgoing connection 2'.

For the sake of simplicity, the following description will be made primarily with reference to the multiplexing function.

FIG. 2 illustrates a transmitter 10 which is able to transmit a sequentially orientated bit stream on each of four connections 2a, 2b, 2c and 2d. The bit streams are mutually shifted slightly in time and are structured as data packets which follow one another in close succession and which together form a grouped logic link. The bit positions of an ATM-related data cell are shown in FIG. 4.

As shown in FIG. 2, for each connection a data cell 20 is preceded by a data cell 21 and is followed by a data cell 22, where the last bit position of a data cell occurs immediately adjacent the first bit position of an immediately following data cell.

Each such data packet or data cell, such as the data packet 20 in FIG. 4, is comprised of 60 octets, wherein a standardized addressable part or a cell header 20a is comprised of 5 octets, an additional addressable part 20b is also comprised of 5 octets and relates to an internally usable address part which is added upon entry of the data cell into a switch and is removed when the data cells leave the switch.

The data packet also includes an information-carrying part or payload part 20c.

Such a data cell will thus have a total of 480 bit positions divided into 60 octets.

The invention is based on the necessity of each data packet used including a predetermined number of bit positions. According to the invention, it shall be possible to divide or coordinate some of these bit positions in a predetermined number of units or parts.

This is illustrated in the exemplifying embodiment insomuch that the data cell 20 includes a first section 20ab (including two sub-sections 20a, 20b) and a second section 20c.

It will also be seen that the section 20ab includes a number of bit positions 20d (one byte sorted in the field 10), which are intended for bit positions representing a control field.

The invention is based on the use primarily of the section 20ab and the control field 20d.

The transmitter 10 includes known means which give the field 20d a bit configuration representative of the value of a check calculation carried out in the transmitter 10 in accordance with a chosen algorithm or via a parity check of the bit positions in the remainder of the section 20ab.

The algorithm chosen or the parity check carried out on the section 20ab shall be given a value which can be recognized by the receiver, this value being assumed to be always "0" for the sake of simplicity.

This section (20ab) will be transmitted by the transmitter 10 together with remaining bit positions (20c) of the data cell to the receiving unit 3 via the connections 2 on respective lines 2a–2d.

It will be noted that even though all data packets should be transmitted simultaneously and in synchronism from the transmitter 10 over the four lines 2a, 2b, 2c and 2d to the receiver 3, it can be assumed that these data packets will not all arrive at the receiver 3 in synchronism and at one and the same time. Even though the data packets are consciously transmitted while displaced in time in accordance with the principles illustrated and described in publication PCT/SE93/ 00277, it would still be necessary to synchronize to a selected time shift.

It is thus necessary to synchronize all received signals in the unit 1.

The principles and functions of the invention will be described initially with reference to the case in which the bit positions on the connection 2a arrive at the receiving circuit 3a in synchronism with a synchronizing signal belonging to or generated by the receiver 3.

As illustrated in FIG. 2, the serially occurring data packets 20 on the connection 2a are delivered to a series-parallel converter 3a, wherein the bit positions of the data packets are divided into parallel-transmittable 20-bit words on a line 25.

As will be seen from FIG. 3, the bit stream on line 2a is delivered to a 20-bit register 21 and moved down to an adjacent register 22.

The bit positions in the register 22 are moved to a register 23 which transfers the bit positions to the control unit 4 in response to an activating signal delivered on the line 24.

The control unit 4 now calculates in a calculating circuit 30 the check sum for four mutually sequential 20-bit sequences and notes that the check sum is "0" wherein the control unit 4 indicates to the synchronizing unit 9 that the check sum was "0" wherewith the synchronizing unit 9 generates, via the line 26, a signal for the beginning of the data packet and each 20-bit sequence can be stored in the memory 5.

By way of a safety control feature, the control unit 4 waits, via a circuit 30', until the calculated bit positions give the value "0" over a number of data packets, for instance four data packets, before accepted synchronization is activated, there being required to this end a counter 31 which enables the total number of bit positions of the data packet to be observed.

Should this calculation not give the result "0", which is assumed to be the case for the line 2b, the control unit 4 sends a command to the synchronizing unit 9 on the line 32, causing the register 22a to move one step or one bit position forwards, via the line 24, whereafter a new calculation is made on four sequential 20-bit sequences belonging to the data packet. Alternatively register 22A could be made to move one step or one bit position backward.

If the calculation results in the check sum "0", then synchronism exists, otherwise the register must again be stepped forwards and all the bit positions of the data packet calculated until synchronism is obtained.

In order for it to be possible to synchronize in this way, it is necessary for all bit positions of each data packet and the values assigned to said bit positions to fulfil at least certain basic criteria when transmitted.

These criteria can be summed up as follows:

a) Each data packet must have a predetermined number of bit positions and a predetermined rate, which is checked in the units 30 and 31.

b) Each data packet will preferably be capable of being divided into a given number of units or parts in a precise manner, for instance two parts, such as the addressable part (20ab) and the information-carrying part (20c).

c) One of these parts, for instance the addressable part (20ab), shall be divisible uniformly into a number of equal sub-sections (for instance four sub-sections of 20-bit words).

d) When transmitting, it is necessary to have assigned to the bit positions within each such subsection (20a, 20b) for respective data packets a bit configuration that corresponds to the desired transmission of information, and that a bit field (20d) has also been supplemented with a configuration such that when all bit positions and their values have been checked, for instance by means of a calculating process 30 with the aid of a selected algorithm or with the aid of a parity check, the check will give one and the same value for each data packet.

e) Each alternate subsection (20c) will preferably not have a bit configuration which with the same number of bit positions as in the section (20ab) and in response to a chosen calculating process or check process gives the same value.

The probability that such a selected sub-section within or between the given sub-sections 20a, 20b and 20c will give an anticipated value for each of a number of mutually sequential data packets shall be small.

The synchronizing logic 9 and/or the control logic 4 include a bit counter 31 so that the total number of bit positions of a data packet will be known and therewith enable the beginning and the end of a data packet to be established.

The same functional flow takes place in principle in the case of a demultiplexing function.

Parallel-formatted data packets originating from the lines 2a–2d can now be delivered to the control logic 4 as a number of 20-bit words via a selected time delay. These 20-bit words are stored in the memory 5 which, in turn, delivers 20-bit words to a buffer circuit which transmits the data packets on a line or a connection 8, via a parallel-series converter 7.

It follows from this that in the case of a multiplexing function or a demultiplexing function in accordance with the present invention, a common synchronizing logic 9 can be used together with a common memory 5, common buffer circuits 6, etc.

A circuit arrangement of the kind described can be used advantageously with a unit described and illustrated in U.S. patent application Ser. No. 08/320,660 filed at the same time as the present application and entitled "A Signal Receiving and Signal Transmitting Unit" or with a unit described and illustrated in U.S. patent application Ser. No. 08/321,180 filed at the same time as the present application and entitled "A Signal Processing Unit", or with a unit described and illustrated in U.S. patent application Ser. No. 08/320,659 filed at the same time as the present patent application and entitled "Multiplexing/Demultiplexing Unit".

Reference is made to these patent applications for a deeper understanding of the application of the present invention, and the contents of these patent applications shall be considered as forming part of the present application.

It will be understood that the invention is not restricted to the aforedescribed and illustrated exemplifying embodiment thereof and that modifications can be made within the scope of the inventive concept as defined in the following claims.

I claim:

1. A synchronizing circuit arrangement, comprising:

a multiplexing/demultiplexing unit for dividing a sequentially orientated bit stream into defined mutually sequential data packets thereby establishing a boundary between two closely adjacent data packets by constantly selecting the bit positions and values within a predetermined part of a consecutive bit sequence in each transmitted data packet so that a predetermined check calculation of the predetermined part will give a predetermined value; the multiplexing/demultiplexing unit including:

a control logic for synchronizing each incoming bit stream by inserting into a series-parallel converter for respective bit streams a time delay corresponding to synchronism;

a memory for receiving from the control logic in a parallel-format synchronized bit stream; and an outgoing connection for receiving the parallel-format synchronized bit stream through buffer circuits and a parallel-series converter;

wherein a bit sequence belonging to received data packets and consecutive to the predetermined part of a consecutive bit sequence is evaluated to establish the extent to which the check calculation gives the predetermined value; and in the event of the check calculation and predetermined value agree, the multiplexing/demultiplexing unit establishes the boundary between two closely adjacent data packets through the bit sequence of the selected part; and in the case of a multiplexing function, the multiplexing/demultiplexing unit coordinates the bit stream into a data packet on a number of incoming connections and one outgoing connection establishing a grouped logic link, and in the case of a demultiplexing function the multiplexing/demultiplexing unit coordinates bit streams into data packets on one incoming connection and a number of outgoing connections establishing a grouped logic link.

2. An arrangement according to claim 1, characterized in that said predetermined part of a consecutive bit sequence is comprised of an addressable part of respective data packets.

3. An arrangement according to claim 1, characterized in that said predetermined part of a consecutive bit sequence is divided into a given number of sub-sections.

4. An arrangement according to claim 1, characterized in that the boundary is not established until agreement is found with regard to a predetermined number of mutually sequential data packets.

5. An arrangement according to claim 1, characterized in that when no agreement is found with any of the incoming connections (2a–2d), the predetermined part of a consecutive bit sequence is moved one bit position forwards or backwards, whereafter a check calculation is carried out on said part in the same way as earlier, so as to establish the boundary when agreement is found and so as to move the predetermined part through a further bit position in the same direction when no agreement is found.

6. An arrangement according to claim 1, characterized in that said, predetermined part of a consecutive bit sequence is divided into at least four sub-sections.

7. An arrangement according to claim 2, characterized in that said predetermined part of a consecutive bit sequence is divided into a given number of sub-sections.

8. An arrangement according to claim 7, characterized in that said predetermined part of a consecutive bit sequence is divided into at least four sub-sections.

9. An arrangement according to claim 2, characterized in that the boundary is not established until agreement is found with regard to a predetermined number of mutually sequential data packets.

10. An arrangement according to claim 3, characterized in that the boundary is not established until agreement is found with regard to a predetermined number of mutually sequential data packets.

11. An arrangement according to claim 6, characterized in that the boundary is not established until agreement is found with regard to a predetermined number of mutually sequential data packets.

12. An arrangement according to claim 7, characterized in that the boundary is not established until agreement is found with regard to a predetermined number of mutually sequential data packets.

13. An arrangement according to claim 8, characterized in that the boundary is not established until agreement is found with regard to a predetermined number of mutually sequential data packets.

14. An arrangement according to claim 4, characterized in that when no agreement is found with any of the incoming connections (2a–2d), the predetermined part of a consecutive bit sequence is moved one bit position forwards or backwards, whereafter a check calculation is carded out on said part in the same way as earlier, so as to establish the boundary when agreement is found and so as to move the predetermined part through a further bit position in the same direction when no agreement is found.

15. An arrangement according to claim 9, characterized in that when no agreement is found with any of the incoming connections (2a–2d), the predetermined part of a consecutive bit sequence is moved one bit position forwards or backwards, whereafter a check calculation is carded out on said part in the same way as earlier, so as to establish the boundary when agreement is found and so as to move the predetermined part through a further bit position in the same direction when no agreement is found.

16. An arrangement according to claim 10, characterized in that when no agreement is found with any of the incoming connections (2a–2d), the predetermined part of a consecutive bit sequence is moved one bit position forwards or backwards, whereafter a check calculation is carried out on said part in the same way as earlier, so as to establish the boundary when agreement is found and so as to move the predetermined part through a further bit position in the same direction when no agreement is found.

17. An arrangement according to claim 11, characterized in that when no agreement is found with any of the incoming connections (2a–2d), the predetermined part of a consecutive bit sequence is moved one bit position forwards or backwards, whereafter a check calculation is carried out on said part in the same way as earlier, so as to establish the boundary when agreement is found and so as to move the predetermined part through a further bit position in the same direction when no agreement is found.

18. An arrangement according to claim 12, characterized in that when no agreement is found with any of the incoming connections (2a–2d), the predetermined part of a consecutive bit sequence is moved one bit position forwards or backwards, whereafter a check calculation is carried out on said part in the same way as earlier, so as to establish the boundary when agreement is found and so as to move the predetermined part through a further bit position in the same direction when no agreement is found.

19. An arrangement according to claim 13, characterized in that when no agreement is found with any of the incoming connections (2a–2d), the predetermined part of a consecutive bit sequence is moved one bit position forwards or backwards, whereafter a check calculation is carded out on said part in the same way as earlier, so as to establish the boundary when agreement is found and so as to move the predetermined part through a further bit position in the same direction when no agreement is found.

* * * * *